UNITED STATES PATENT OFFICE.

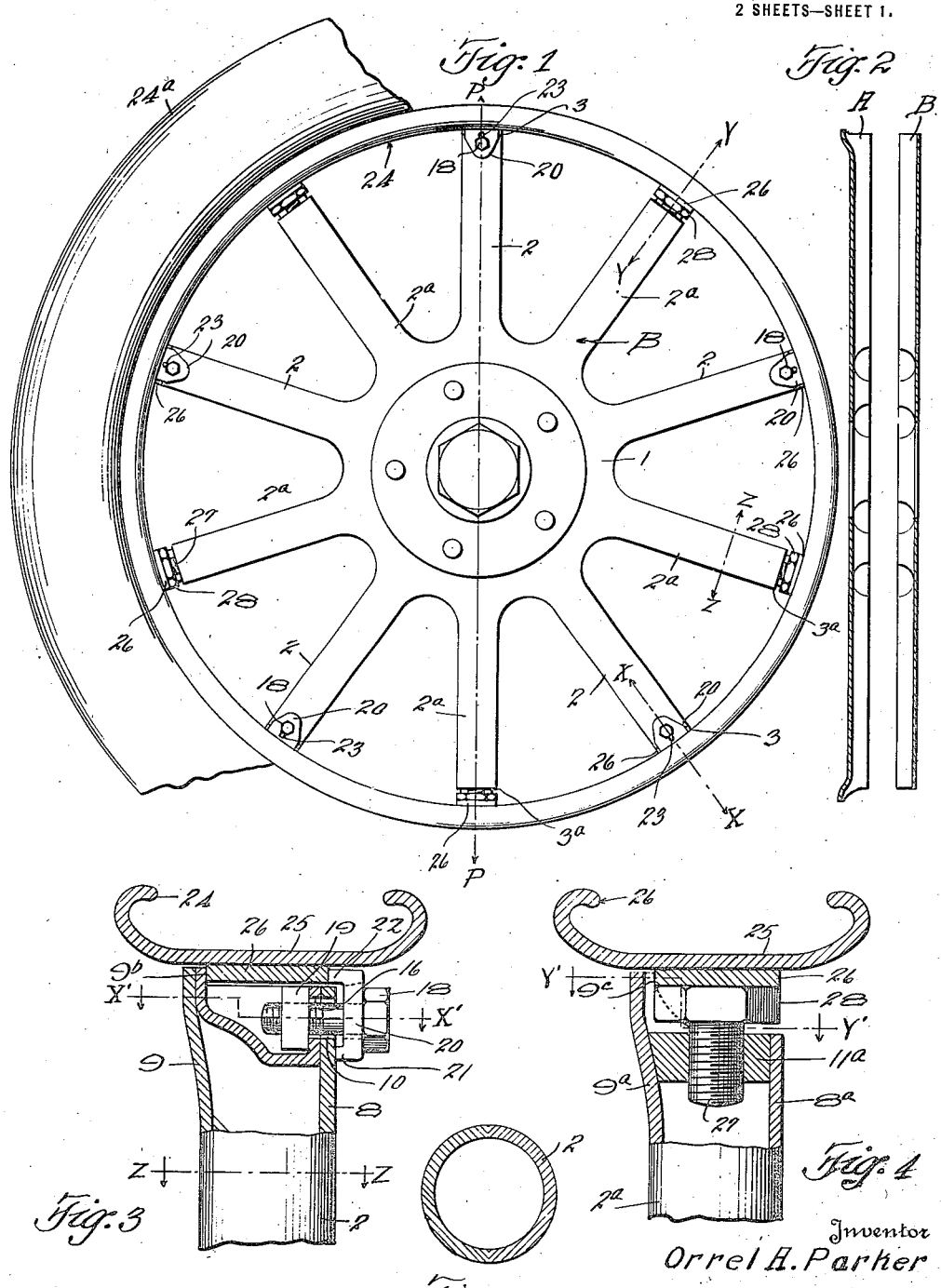

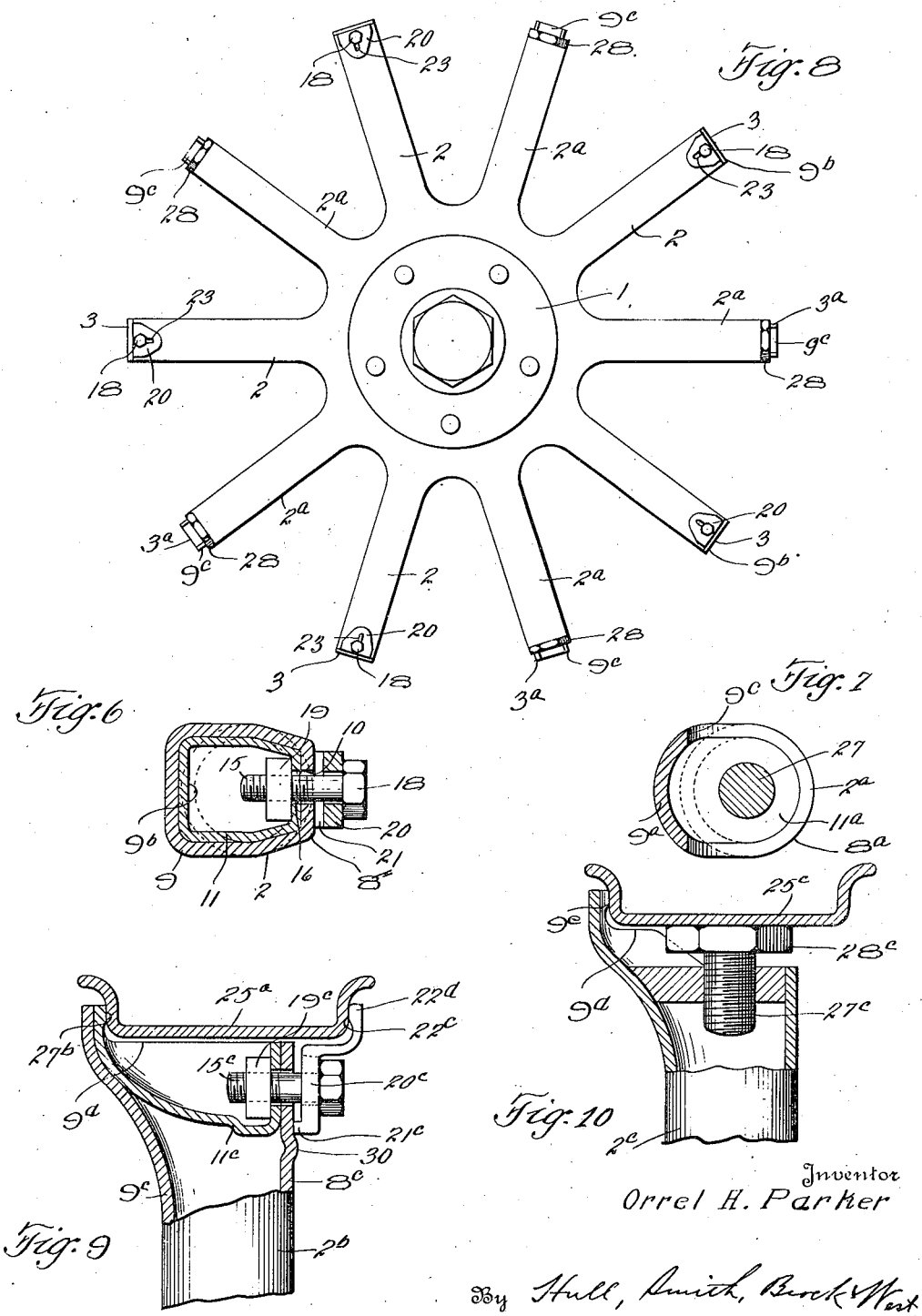

ORREL A. PARKER, OF CLEVELAND, OHIO.

VEHICLE-WHEEL.

1,188,353.  Specification of Letters Patent.  Patented June 20, 1916.

Application filed May 5, 1916. Serial No. 95,583.

*To all whom it may concern:*

Be it known that I, ORREL A. PARKER, a citizen of the United States, residing at Cleveland, in the county of Cuyahoga and State of Ohio, have invented a new and useful Improvement in Vehicle-Wheels, of which the following is a specification.

This invention relates to improvements in the spider parts of vehicle wheels which, respectively, are composed of demountable rims and spiders consisting of hubs and spokes, the spokes being separate from each other and having their outer ends free.

The object is to so construct the spider that the demountable rim can be secured upon the free ends of the spokes by devices which will clamp or grip it with an exertion of pressure on axial lines only and by other devices which will exert pressure on radial lines only, the two sets of pressure-exerting devices being independent, and acting independently, of each other.

Figure 1 is a face view of a wheel embodying my improvements; Fig. 2 is a section on the line P, P of the two main spider elements used in constructing the wheel, showing the halves separated. Fig. 3 is a vertical section on the line $x$—$x$ of Fig. 1; Fig. 4 is a section on the line $y$—$y$ of Fig. 1; Fig. 5 is a horizontal section on the line $z$—$z$ of Figs. 1 or 3. Fig. 6 is a horizontal section on the line $x'$—$x'$ of Fig. 3; Fig. 7 is a section on the line $y'$—$y'$ of Fig. 4; Fig. 8 is a face view of the spider. Figs. 9 and 10 illustrate modifications of details.

I will first describe, somewhat in detail, the construction shown in Figs. 1 to 8, inclusive, in order that a full understanding of the invention may be had, but wish to be understood that I do not limit myself in respect to the specific details of construction or relationship so long as the essential features of the invention are retained.

The wheel shown is composed of two main spider elements A and B in Fig. 2. These are cut from sheet metal and, by suitable swaging or stamping action, are brought to the shape shown in Fig. 2. These two half elements are then properly disposed relatively and are secured together by any suitable process, as by welding in one way or another. When they are secured together, they provide a hub element at 1 and a series of spokes 2, 2ª, the terminal parts of which, respectively, are indicated at 3, 3ª.

A cross section of one of the spokes 2 in the illustration is shown in Fig. 5; the cross section of the terminal parts of this spoke is shown in Fig. 6; and the terminal parts of one of the spokes 2ª is illustrated in Fig. 7.

The spokes 2 and 2ª are tubular and approximately circular in cross section, as in Fig. 5. The truly tubular conformation of each tube 2 does not extend to the outer end. As shown in Fig. 3, the front part extends to the end as a part of a tube (see 8). The rear half at the end is curved outward and upward, as shown at 9. Preferably, that part of the upper edge of the end which lies in front of the part 9 is squared, as at 9ᵇ, with the top edge of the front part 8, that is, the upper edge part 9ᵇ, be it longer or shorter, lies in an axial plane, a plane truly parallel to the axis. The rear backwardly turned part 9 projects radially to a distance somewhat above the plane of the edge 9ᵇ to provide an abutment.

In the upper open end of the tubular spoke 2 there is mounted a cup or re-inforcement indicated, as a whole, by 11. This cup closes the end of the spoke, acts as a reinforcement, and serves to hold the nut 19. This cup or reinforcement 11 conforms to the shape of the inside of the spoke end and is firmly secured thereto by some such process as welding or riveting.

Through the front part 8 of the spoke 2 and the front of the cup 11 are registering apertures 10 and 16. Through the passage thus provided, a horizontal bolt 15, having a head 18, engages with a nut 19 in the cup chamber in the spoke end.

20 indicates an adjustable pressure device and lock having an end 21 with an abutment to bear against the spoke wall 8, a longer abutment lug 22 at the upper end, and a slot 23, through which the bolt 15 passes. On withdrawing the bolt a short distance outward, this clip for pressing and clamping will be loosened and will then be permitted by its slot 23 to move radially inward.

The tire 24ª has a metallic rim 24. It is formed with a band or annulus 25 at the center, and at the edges with suitable flanges for holding the tire, proper. The central part 25 may extend continuously and without break around the entire wheel, or it may be trans-split and provided with any of the ordinary joining devices for the ends.

At intervals around the rim, blocks, or short plates, 26, are applied to serve as spacers, radially, and to act conjointly with other parts in holding the rim in place.

As shown in Figs. 1 to 8, there is one of these blocks on the rim for each of the spokes 2, 2ª. Each block alines axially with the upwardly projecting extension of the parts 9, 9ª, and the bearing lug 22 of the clamping devices 20, 20, can also be alined with the block at each clamping spoke.

The construction at the outer ends of each of the spokes 2ª and the parts used at that point, are shown in Fig. 4. The front 8ª of the tubular spoke is radially somewhat shorter than that in the corresponding part in the spokes 2. The part 9ª provides a stop flange 9ᶜ, somewhat crescent shaped as shown at 9ᶜ, Fig. 7. In this instance the upper end of the spoke 2ª is provided with a plug-like device 11ª, tightly fitted and secured between the front and rear parts 8ª, 9ª. A large strong bolt 27 is threaded into a threaded aperture in this plug. The bolt 27 terminates in a widely expanded head 28, which fits against the inner face of the rim, or against one of the blocks 26 fitted thereto.

When the parts are constructed as in Figs. 1 to 8 and as above described, the following steps are taken to mount a rim on a spider: The pushing clips or clamps 20 are all loosened and moved radially inward to lie within the circle of the blocks 26. And the radial screws 27 are turned until the under sides of their heads contact with the spoke ends. The rim, with its tire, is then put into position to properly register with the ends of the spokes and moved axially far enough to be seated on the spokes. Then the clips or clamps 20 are slipped outward, radially, far enough to bring their abutment ends 22 into alinement with those blocks 26 which register, peripherally, with the spokes 2. Then the bolt 15 is turned in the nut 19 until the blocks 26 are forced on axial lines to the stops at 9ᵇ the spokes having sufficient rigidity to permit considerable force being used in bringing the rim to the fixed stop without any of the spokes being distorted. And when the clips or clamps and bolts of the entire series have been thus brought to final position, the tire rim is firmly bound, axially, in place. Outward radial pressure upon the rim to cause peripheral tension on the rim is then effected by applying a tool to the heads 28 of the bolts 27. This radial pressure can be applied to an optional extent to tension the rim and compress the central structure, regardless of variations in the internal circumferences of the rim, due to imperfections of manufacture or other causes.

It is to be noted that the abutting surfaces at the inner edge of the blocks 26 and the abutting surfaces at the outer edges of the blocks, and the inner edges of each lug 20 are at right angles to the lines on which the inward pushing and the clamping forces are exerted by the bolts 15 and clips 20. This is in contradistinction from the shapes of the contacting parts and the method of forcing them together, which are universally adopted in securing demountable rims in place; virtually, the universal practice being to have one or both of the contacting surfaces inclined both to the axis and to the radius of the wheel for the purpose of exerting forces in two directions by a single device. This device is sometimes a mating pair of inclined surfaces on two interengaging parts, one carried by the rim, and the other by the spokes, these inclined surfaces being on wedges, bolt tops, or the like. Similarly, as will be seen on examining Fig. 4, the contacting surfaces of the parts 26 and 28, by which pressure is exerted radially, are formed on planes which are truly parallel to the axis and tangential to the circumference of the spider, and, therefore, force can be exerted in radial directions only when the head and the threaded elements at 27 are brought into play.

The disadvantages incident to transmitting to the rim a force on radial lines and force on axial lines, simultaneously, by a common device, are well known. At many points in the circle of the rim, to get the best results, it may be necessary to subject the rim to stress, axially, up to a predetermined limit and there stop, and then continue to exert stress, radially, independently of the exerting of stress axially; and vice versa.

I have heretofore constructed wheels in which the parts embodied the principle of axial clamping and radial tensioning, which I have described; but in the earlier structure there was a wheel body, including elements extending from the end of one spoke to the ends of those adjacent of the nature of a felly. But I have found it desirable for many reasons to provide greater elasticity in the peripheral parts of the structure, especially where rim clamping and tensioning devices of the sort herein shown are present. This elasticity is largely interfered with when use is made of thick and relatively unyielding felly elements, together with a tightly bound felly band. In the latter case the tire and its rim are called upon to provide the greater part of the yielding and elasticity. I have found that when a rim of the class of that here involved is to be demountably secured in place, I can obtain better effects from the wheel when in operation by having individual spokes secured to the rim independently of each other and one spoke more or less independent of its neighbors for a distance considerably in from the outermost end.

While the spokes of a metallic spider of the kind illustrated may appear to be in true or proper position, they may, in reality, be twisted or turned slightly on their own axis, or they may be imperceptibly bent laterally, and by the use of the positioning clamps, the spoke ends are brought to their actual true or proper position, or as nearly so as possible; so that not only is the rim positioned in a true plane, but also any errors in the individual spokes are corrected.

As indicated above, I have described, quite in detail, one form of wheel structure embodying my improvements, but, as also noted, there can be variations. The spider part, to wit, the spokes and hub of the wheel, can be otherwise made. The spokes may be made of wood or metal. The axial pressure for forcing the rim home, axially, to its predetermined position may be caused by devices of any of the now well-known sorts. The stops which positively limit this axial movement may be provided in any of numerous ways. The blocks 26, which serve as spacers, stops and pressure receivers, can be elongated or increased in number; they may be omitted entirely or a continuous band may be substituted, or the rim metal, itself, can be so conformed as to serve all of these purposes. The rim shown in Figs. 1 to 8 is of the clencher type, but it can be varied as desired. But in any modified form, the essential features of the improvement will be retained if there are present (a) a spider-like system of parts, each with a hub and a series of spokes that have free ends, (b) a demountable rim, (c) devices which provide a positive stop against axial movement of the rim at a predetermined position, (d) devices for exerting pressure laterally upon the rim, or on a part carried thereby, to bind it in place against the said stop devices, and (e) means bearing outwardly against the rim for exerting thereon pressure on radial lines only.

As showing that demountable rims, shaped for straight-side tires, as well as rims for clencher tires, can be advantageously held in position by devices embodying my invention, reference can be made to Figs. 9 and 10. Fig. 9 presents a radial section through the terminal parts of one of the spokes of one of the sets of spokes on the wheel; and Fig. 10 gives a radial section of each of the spokes of another set.

In Fig. 9 the parts at 8$^c$, 9$^c$, 11$^c$ and 15$^c$ are substantially the same as those shown in Fig. 3. But the spacing and butting blocks 26 are omitted and the square or radial faces at 22$^c$ and 27$^b$ are utilized for stopping the on-moving rim and for receiving the axial force from the screw 15 and from the clamp or pressure device 20$^c$. The latter, in this case, has a flange 22$^d$, which lies in truly radial planes. Therefore, when force is exerted by the bolt 15$^c$ and nut 19$^c$ no pressure is exerted to press the rim, radially, outward. All the force of the bolt transmitted through the clip or lock piece 20$^c$ is transmitted to the rim on lines parallel to the wheel axis. The clip 20$^c$ in this case is provided with a projection 30 on the spoke for holding it in place when it, the clamp, is in its uppermost position, and is subjected to only slight pressure from the bolt. On withdrawal of the bolt, the lower end 21$^c$ of the clamping piece can move out slightly and escape this lug or stud 30 and slide radially inward. The bottom band element 25$^c$ is so arranged that it can rest upon shoulder edges at 9$^d$ at the outer ends of the spokes when radial tension is exerted.

Such tension is caused by devices shown in Fig. 10 with which alternating or intervening spokes are provided. Normally, the band part 25$^c$ at these spokes rests upon the shoulders 9$^d$, which are radially inside of the projecting stops 9$^e$. The radial pressure is exerted by bolts 27$^c$ of large diameter, having their heads contacting squarely with the rim, similar to devices at 27 and 28 in Fig. 4.

Instead of having the axial clamping devices supported on the spokes of one set, and the radially acting pressure devices separately supported on other spokes, any one of the spokes can, at its outer end, be so constructed or provided with such devices that both the lateral binding or clamping and the exerting of radial pressure can be accomplished at one place.

Three spokes may have lateral clamps and six spokes may have radial pressure devices in a nine-spoke wheel, or any other combination of lateral and radial pressure devices found needful or convenient may be used.

I do not herein claim any of the subjects-matter described in the claims in my application, Serial No. 88,262, filed on or about April 1, 1916. I therein show a wheel structure having a hub, spokes, a circular connector device at the outer extremities of the spokes for binding them together, this being of the nature of an ordinary felly, and a demountable rim held by devices which are carried by this circular connector or felly. In the present application I have shown a central wheel structure which omits this connecting element. The claims herein are limited to this last described specific form.

What I claim is:

1. The combination with a hub and a series of spokes, of a demountable tire-carrying rim arranged thereon, means for exerting against said rim lateral pressure only, and means independent of the aforesaid for exerting against the rim radial pressure only to an optional extent and effecting the compression of the wheel system independently of the said means for exerting the lateral pressure on the rim.

2. The combination with a demountable tire-carrying rim, of a hub and spokes, said rim being adapted to fit upon said spoke ends, means for exerting lateral pressure upon said rim, and means independent of the aforesaid for exerting radial pressure upon said rim and at points removed from the said application of lateral pressure.

3. The combination with a demountable tire-carrying rim, of a hub and spokes, said rim being adapted to fit upon said spoke ends, laterally operative means for positioning and clamping said rim upon said spoke ends, and radially operative means adapted to tension said rim to an optional extent and effecting the compression of the wheel system independently of the said means for exerting the lateral pressure on the rim.

4. The combination with a demountable tire-carrying rim, of a spider comprising a hub and spokes, the ends of said spokes being shaped to receive and provide a positive stop for said rim, means acting upon said rim for exerting lateral pressure only, and means independent of the aforesaid for exerting radial pressure only upon said rim to an optional extent and effecting the compression of the wheel system independently of the said means for exerting the lateral pressure on the rim.

5. The combination with a demountable tire-carrying rim, of a hub and spokes, the ends of said spokes being shaped to receive the said rim thereon, lateral clamps carried by some of said spokes adapted to exert lateral pressure upon said rim, and radial tensioning means carried by other spokes and adapted to engage said rim and tension the same upon the spokes.

6. The combination with a demountable tire-carrying rim having inwardly projecting portions at predetermined points, of a spider comprising a hub and spokes, the ends of said spokes being shaped to receive said rim and provide a positive stop therefor, lateral clamps adapted to engage said rim and clamp the same to said spider, and radially operative means adapted to tension said rim to an optional extent and effect the compression of the wheel system independently of the said means for clamping said rim.

In testimony whereof, I affix my signature, in presence of two witnesses.

ORREL A. PARKER.

Witnesses:
 HENRY H. BLISS, Jr.,
 COURTLAND E. CHRISTIANI.